May 2, 1933. B. M. SCHAUMAN 1,907,160
AIRCRAFT
Original Filed July 25, 1929 5 Sheets-Sheet 1
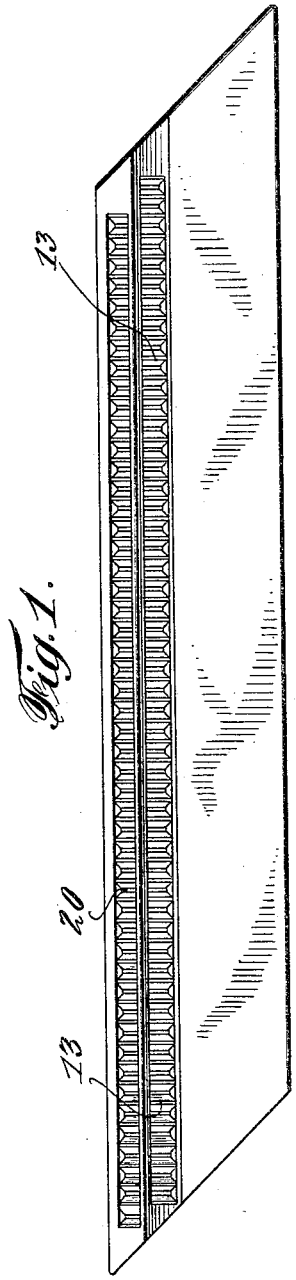
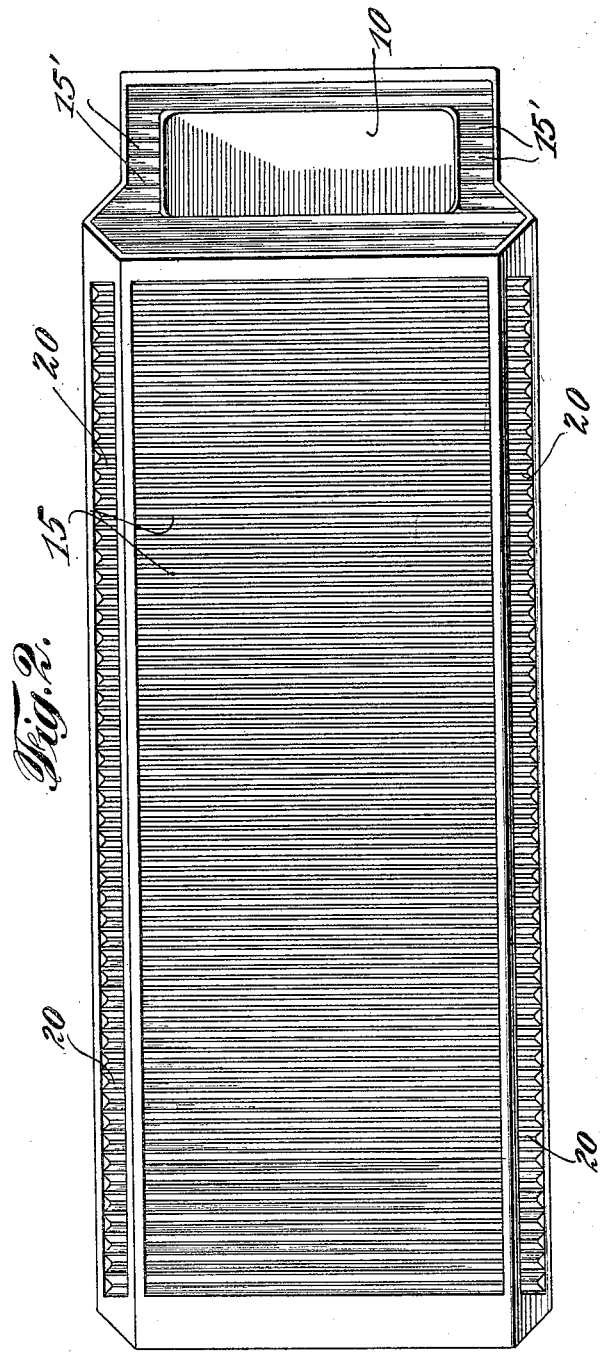
INVENTOR
Bror Max Schauman
BY
his ATTORNEY May 2, 1933. B. M. SCHAUMAN 1,907,160
AIRCRAFT
Original Filed July 25, 1929  5 Sheets-Sheet 2
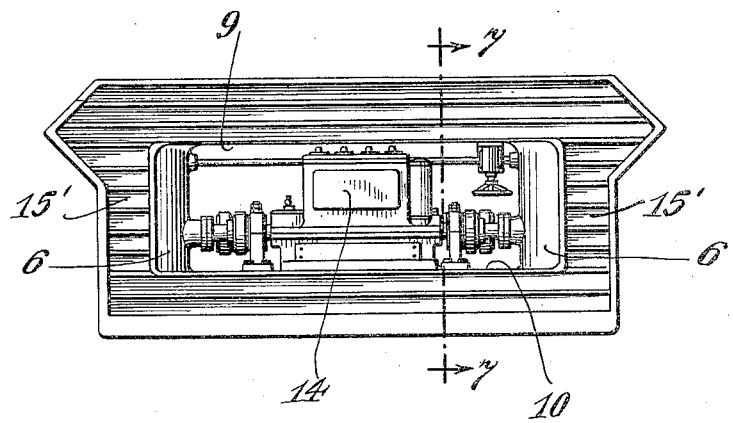
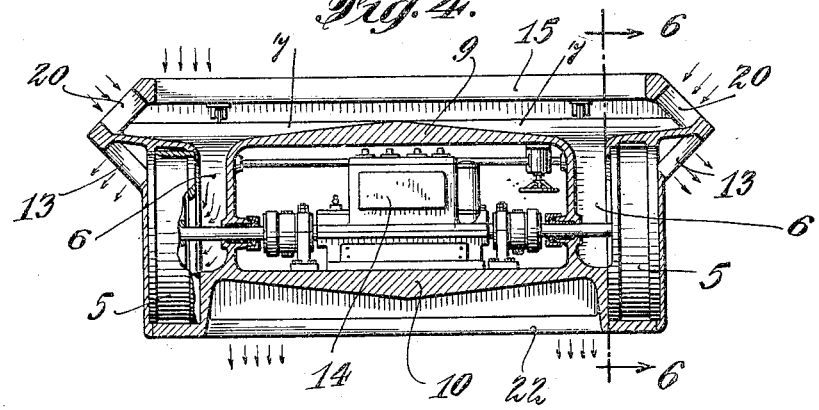
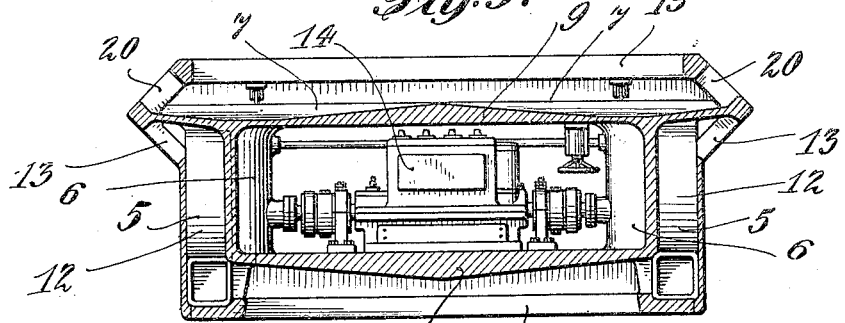
INVENTOR
Bror Max Schauman
BY C. P. Goepel
his ATTORNEY

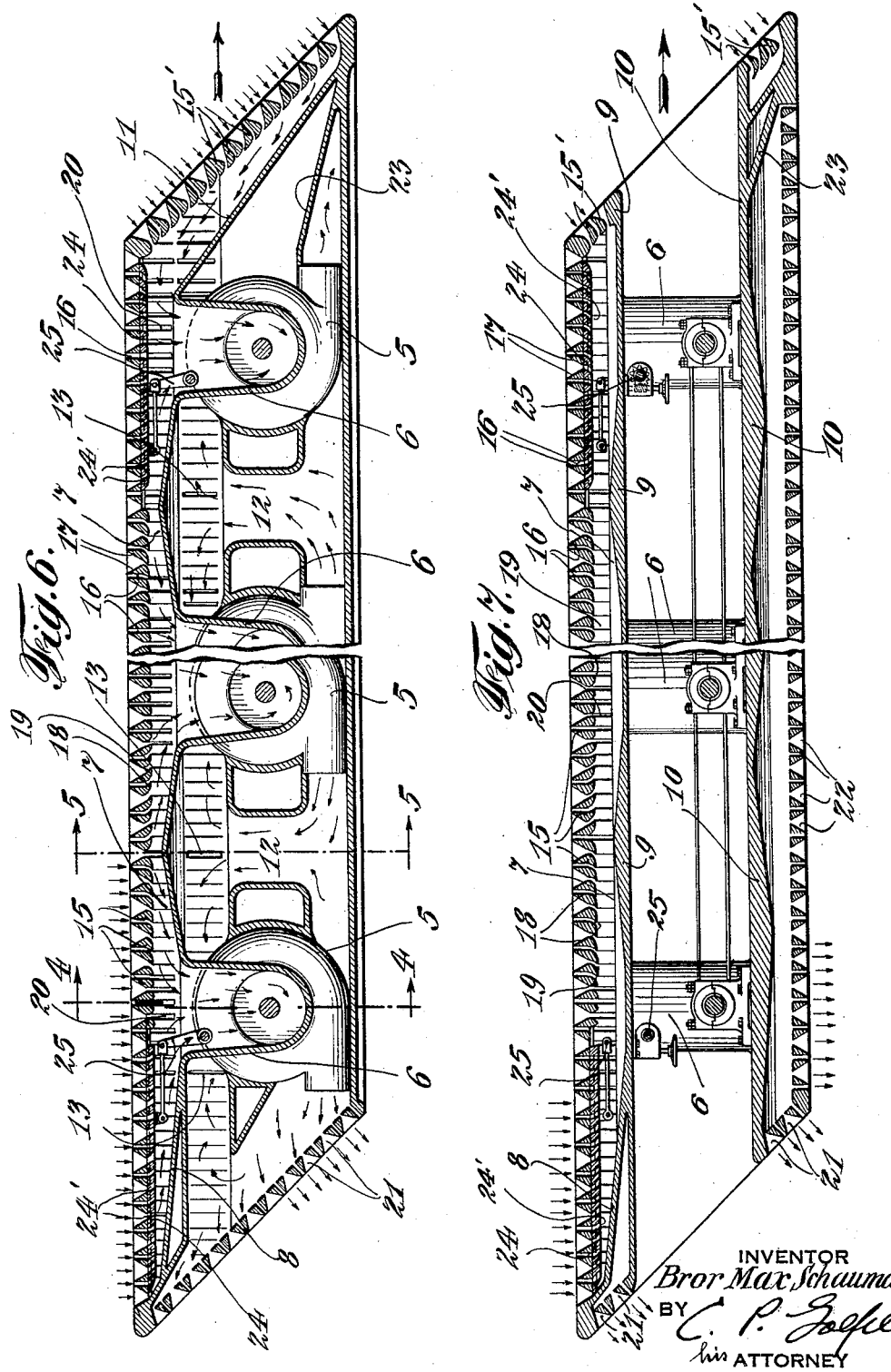

May 2, 1933.  B. M. SCHAUMAN  1,907,160
AIRCRAFT
Original Filed July 25, 1929   5 Sheets-Sheet 4

INVENTOR
Bror Max Schauman
BY
his ATTORNEY

May 2, 1933.  B. M. SCHAUMAN  1,907,160
AIRCRAFT
Original Filed July 25, 1929   5 Sheets—Sheet 5
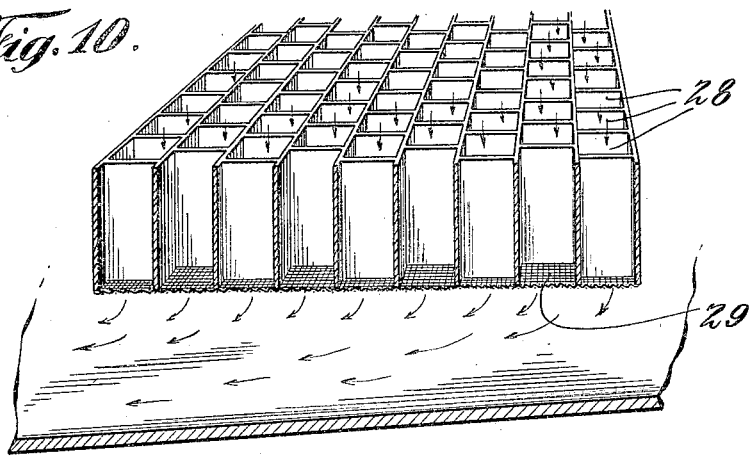
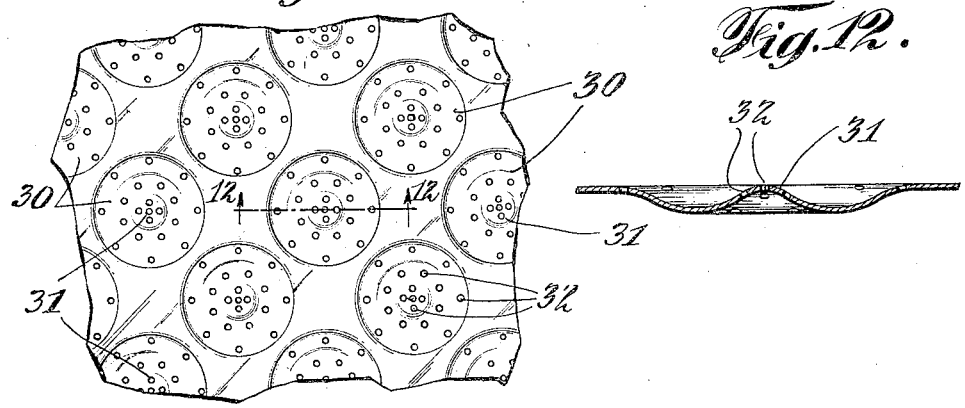
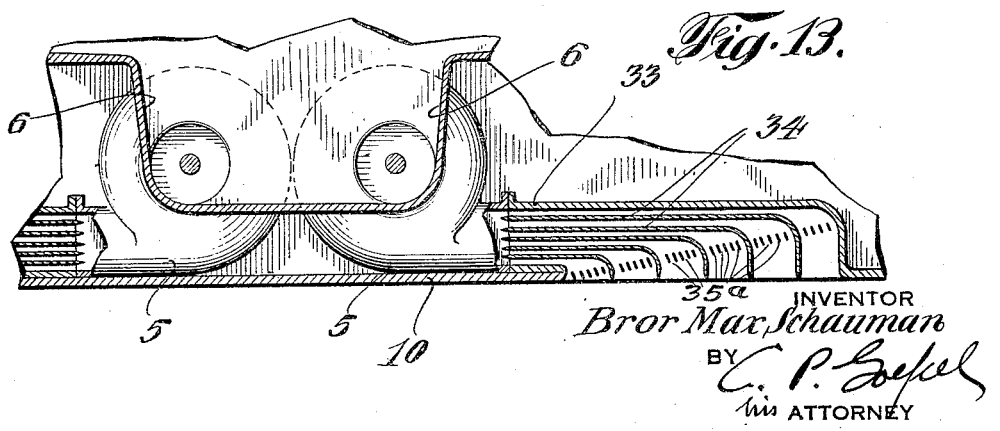
INVENTOR
Bror Max Schauman
BY
his ATTORNEY Patented May 2, 1933

1,907,160

UNITED STATES PATENT OFFICE

BROR MAX SCHAUMAN, OF ATLANTIC HIGHLANDS, NEW JERSEY

AIRCRAFT

Application filed July 25, 1929, Serial No. 380,781. Renewed August 17, 1932.

This invention relates to aircraft and generically considered has for its primary object and purpose to provide means, for use in connection with aircraft or flying machines of the heavier than air type, whereby the aircraft may be caused to move through the air.

It is a further object of the invention to provide means whereby the aircraft may be caused to rise, or descend, vertically.

It is a particular object of the invention to provide an improved construction of aircraft, together with actuating means carried thereby, whereby a vacuum, or partial vacuum, may be created over desired surface areas of the machine, and, in the preferred form, whereby pressures above atmospheric may also be created over other desired surface areas.

It is a further object of the invention to provide an improved construction of desired surface areas of the aircraft whereby the uniform distribution of the vacuum, or partial vacuum, or excess pressure, is facilitated.

One of the main objects of the invention is to provide within the aircraft, actuating means, such as motor actuated blowers; to provide selected surface areas of the aircraft with distributed cells, pockets or cavities in communication with said actuating means; so that in the operation of the said actuating means air will be drawn through said pockets or cells into the aircraft in such a way as to create a reduced pressure over said selected areas. The air may be discharged, at a desired pressure, through other selected surface areas in such a way as to create an increased pressure over said areas.

It is also another object of my invention to provide simple and easily operated means whereby the vacuum effect upon different surface areas may be controlled and entirely cut off if desired in order to facilitate control of the flight of the aircraft.

It is a more particular object of the invention to provide within the body or fuselage of the machine a plurality of motor operated high pressure blowers at each side thereof having interconnecting intakes and the top wall of the fuselage being provided throughout its area with uniformly distributed cells, pockets or cavities in communication with the interconnected blower intakes so that in the operation of the blowers, the collapsing air films drawn through these pockets or cells will produce a strong vacuum effect. The air is delivered under high pressure from the several blowers and discharged through the bottom and the rear end of the fuselage in such a manner as to result in an appreciable lifting impulse which, in view of the absence of atmospheric pressure on the upper side of the fuselage, will cause the machine to ascend.

I also preferably provide the bottom structure or fuselage in the form of a parallelogram having obliquely inclined front and rear ends, and the front end thereof being provided with additional vacuum creating cups or cavities in communication with the blowers arranged in the forward end of the machine, while the rear end of the body or fuselage is provided with outlets or discharge openings through which part of the air drawn through the machine by the blowers is finally exhausted.

It is also another object of my invention to provide simple and easily operated means whereby the vacuum effect upon different portions of the upper wall of the fuselage may be controlled and entirely cut off when necessary in order to cause the machine to either ascend or descend.

With the above and other objects in view, the invention consists in certain improvements in aircraft as above characterized, and which will be hereinafter more fully described in detail and illustrated in the accompanying drawings, wherein I have disclosed several alternative forms of the important structural features of the invention, and in which similar reference characters designate corresponding parts throughout the several views.

Referring to the drawings,—

Figure 1 is a side elevation of the body structure or fuselage for aircraft provided with my present improvements;

Fig. 2 is a top plan view thereof;

Fig. 3 is a front end elevation;

Fig. 4 is a transverse sectional view taken substantially on the line 4—4 of Fig. 6;

Fig. 5 is a similar sectional view taken substantially on the line 5—5 of Fig. 6;

Fig. 6 is a longitudinal sectional view taken on the line 6—6 of Fig. 4;

Fig. 7 is a longitudinal sectional view taken on the line 7—7 of Fig. 3;

Fig. 10 is a view similar to Fig. 9 showing a further modification;

Fig. 11 is a fragmentary plan view showing another alternative form of the vacuum producing means;

Fig. 12 is an enlarged detail section taken on the line 12—12 of Fig. 11, and

Fig. 13 is a fragmentary vertical sectional view showing a modified arrangement of the suction blowers and means for discharging the air therefrom through the bottom of the fuselage.

Figure 8:
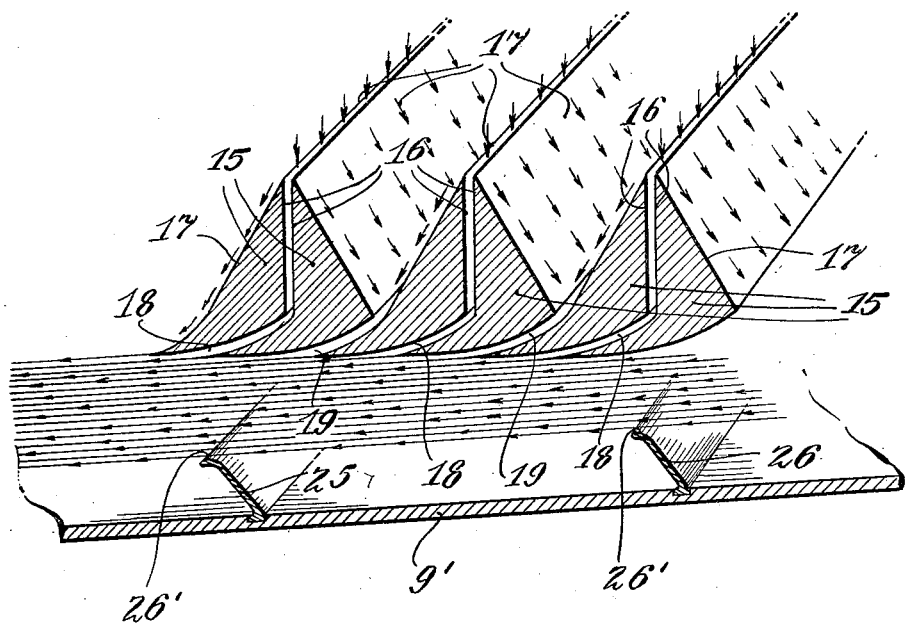
Fig. 8 is an enlarged sectional perspective view of a part of the top wall of the fuselage or body structure showing one form of the vacuum creating means and also illustrating an arrangement of spaced lifting vanes or blades below said top wall.

Referring in detail to the drawings, the body or fuselage of the machine which may be produced in any desired predetermined dimensions, is in the general form of a parallelogram, the end walls of which are obliquely inclined at an angle of substantially 45°. This body structure may be produced from aluminum or other relatively light material, and it will be understood that in the drawings I have illustrated only those parts of the structure which are necessary to an adequate understanding of the principles underlying my present invention. This fuselage may be provided with any desired arrangement of ailerons for directing or guiding the lateral flight of the machine, and suitable provision will be made for the pilot or operator and one or more passengers.

In accordance with one embodiment of my invention, the fuselage is provided at each side thereof with longitudinally spaced high pressure blowers indicated at 5. A longitudinally extending wall has depending portions 6 which extend around the blower intakes, said wall between the parts 6 thereof and the top of the fuselage passages 7 connecting the blower intakes with each other. The wall 6 has a part 8 extending upwardly and rearwardly in convergent relation to the top wall of the fuselage. These side walls which form the air intake passages leading to the several blowers are integrally connected with each other by the upper and lower walls 9 and 10 respectively, the space bounded by said upper and lower walls and the opposite side walls however, being open at the opposite ends of the fuselage. The rear end parts 8 of said side walls are also integral parts of the top and bottom walls 9 and 10. The front end portions of said longitudinal walls forming the air intake passages are downwardly inclined as at 11 and preferably converge towards the lower end of the forward obliquely inclined end wall of the fuselage.

Preferably, I use four of the blowers at each side of the machine, two of which have their outlets forwardly discharging while the outlets of the other two blowers discharge in a rearward direction. Between the spaced blowers, the passages 12 are provided which receive the air exhausted from the blowers and discharge the same through suitable outlets indicated at 13 in a section of the outer side wall of the fuselage which is inclined upwardly and connects with downwardly inclined side portions of the top wall of the fuselage as clearly shown in Figs. 4 and 5 of the drawings. However, this particular form of the wall structure is of minor importance and may be changed as desired.

The correspondingly located blowers at opposite sides of the fuselage are driven by a common motor indicated at 14 suitably mounted and arranged on the lower wall 10.

The top of the fuselage at the upper side of the connecting passages 7 between the blower intakes is constructed to provide means whereby the vacuum produced in the operation of the several blowers may be more uniformly distributed over the area of said top wall and results in the greatest buoyancy by relieving the upper side of the fuselage of atmospheric pressure. Thus, in one embodiment, this top wall may consist of closely arranged transversely extending ribs 15 having opposed parallel side faces 16. The other side faces of these ribs are reversely inclined as at 17. Thus, the oppositely inclined faces 17 of the ribs form a transversely extending downwardly tapering pocket or trough. The ribs 15 have lower laterally extending curved portions disposed in overlapping spaced relation, thereby producing air passages as indicated at 18 and 19 respectively, which communicate at one of their ends with the spaces between the opposed faces 16 of the ribs and with the base of the trough formed by the opposed downwardly inclined faces 17. The outlet ends of these passages 18 and 19 are disposed substantially in a common plane tangent to the lower convex surfaces of the several ribs. As clearly shown in Fig. 6 of the drawings, at each side of a central point between the spaced blowers 5, the curved lower laterally projecting portions of the ribs 15 and the passages 18 and 19 extend in opposite directions, such curvature gradually decreasing in the vicinity of the blower intakes so that directly above the blower intakes, the ribs are not provided with the laterally curved lower portions, and the air inlet passages are entirely disposed in vertical planes.

At the front end of the fuselage, a similar arrangement of the transversely extending pocket forming ribs 15′ is provided and likewise the downwardly inclined sections of the top of the fuselage structure at each side thereof are provided with these ribs to afford additional air inlets indicated at 20.

The rear obliquely inclined end wall of the fuselage structure is likewise composed of an arrangement of transversely extending ribs which provide narrow exhaust or outlet passages or openings 21 for the air discharged by the several blowers. A part of the air discharged by the blowers may also find egress from the space between the lower wall 10 and the bottom of the fuselage structure through the outlet passages or openings 22 in the latter. At the outlets of the front blowers 5, the walls 23 are inclined downwardly therefrom and a further lifting effect is produced by the initial impingement of the discharged air against the under sides of these walls.

In Fig. 6 of the drawings, I have also shown slidably mounted shutter plates 24 arranged beneath the front and rear end portions of the top wall of the fuselage which may be operated by any suitable mechanical means such as that indicated at 25 so that the air inlet passages 18 and 19 in these parts of the top wall of said structure may be opened or closed at will.

From the above, the manner of operation of this particular embodiment of the invention will be readily understood. Thus, when the several blowers 5 are set in operation, a strong vacuum will be produced in the space between the top of the fuselage structure and the wall 9 and within each of the troughs formed by the convergently inclined opposed faces 17 so that the air film immediately overlying the top of the structure will be broken down and drawn along said inclined surfaces 17 as well as between the parallel surfaces 16 and inwardly through the passages 18 and 19. This air from different parts of the top wall of the structure will be drawn both forwardly and rearwardly by each blower through the passages 7 and likewise through the front end of the fuselage structure between the same and the wall 11. Thus, there is an equal distribution of the vacuum producing effect created by each blower. The curvature of the lower end portions of certain of the passages 18 and 19, causes the air streams to be drawn horizontally to the blower intakes so that there is scarcely any downwardly directed pressure from these air streams against the top wall 9. The air discharged by the several blowers enters the passages 12 or passes below the wall 10 and is either discharged laterally externally of the structure through the side openings 13, or downwardly through the bottom openings 22. These openings at their inner sides being relatively narrow flaring outwardly, as the fine streams of air are discharged therethrough, they will exert a lifting impulse against the oppositely inclined surfaces of the opposed ribs forming said outlets. The cumulative lifting effect which is thus produced is quite appreciable, and by the elimination of the atmospheric pressure on the upper side of the fuselage structure and a constant upward pull of the vacuum with the greater density of air beneath said structure, the machine will be caused to rise in a vertical direction. At the same time, in the continued operation of the blowers, as the air is drawn through the inlets at the front end of the fuselage and discharged through the rear end thereof, the machine will also move forwardly. When it is desired to elevate or depress either end of the machine, one or the other of the slide plates 24 is moved to its closed position where the slots 24′ which are provided in said plates are out of registration with the air inlet passages 18 and 19 in the top of the fuselage structure. Thus the vacuum effect on this part of the top of the fuselage is destroyed so that this end of the fuselage will be depressed, and the machine will as a whole then be disposed at an inclination either upwardly or downwardly with respect to the general line of flight. In Fig. 8 of the drawings I have shown spaced transversely extending vanes 25 and 26 secured to the upper wall 9′ and obliquely inclined in the direction of longitudinal flow of the air which is drawn through the passages 18 and 19, the upper edges of these vanes 26 being curved as indicated at 26′ and extending in substantially parallel relation to the wall 9′. The air being drawn over the upper edges of these spaced vanes at very high velocity, creates eddy currents adjacent to the wall 9′ which act against the inclined vanes 26 and thus produce an additional lifting impulse.

Figure 9:
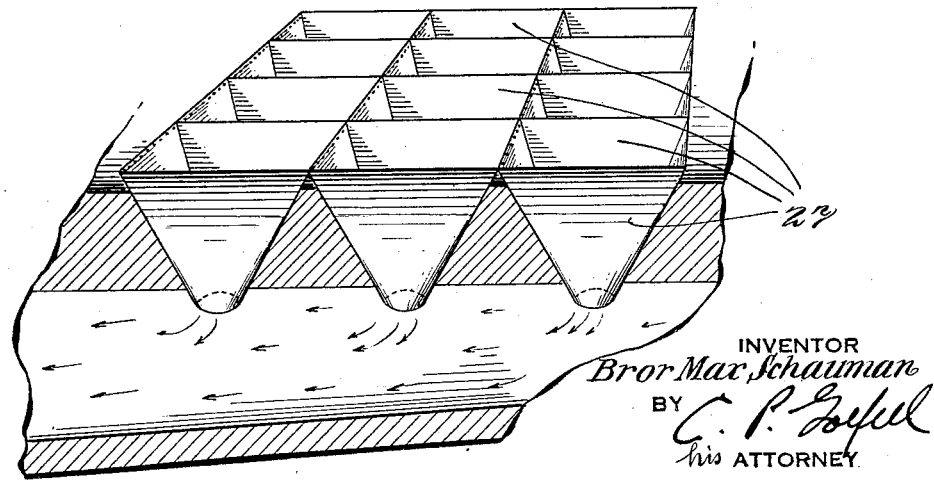
Fig. 9 is a view similar to Fig. 8 showing an alternative form of the vacuum producing means.

In Fig. 9 of the drawings, I have shown a slightly modified construction specially designed for use in connection with a body structure or fuselage of wood, in which the vacuum pockets or cavities in the top wall of the fuselage may be in the form of connected conically shaped sheet metal cells 27 which are set into apertures of corresponding shape and suitably secured in the top wall of the fuselage. The lower egress ends of these cells terminate in spaced relation to each other at a slight distance below the under surface of said top wall.

Fig. 10 illustrates a further modification, in which the cells 28 are of rectangular form and the cells in the transversely extending rows thereof are staggered with relation to each other. The lower egress ends of these cells are preferably covered by a suitable fabric material shown at 29.

In Figs. 11 and 12, a further alternative construction of the top wall of the fuselage is illustrated particularly designed when such structure is produced from fabricated sheets of aluminum or other metal. Thus the top wall or sheet may be provided at equi-distantly spaced points with the depressions or cup-shaped formations 30 of circular form, the central portions of which are upwardly projected to produce a shallow cone indicated at 31. The concave and convex walls of this annular trough or cup which is thus formed in the metal sheet are provided with a multiplicity of perforations indicated at 32. Through these perforations, the air is drawn over the surfaces of said walls in the operation of said blowers, thereby producing the desired vacuum effect over the entire surface of the metal sheet.

In Fig. 13, I have shown another possible construction, in which the central pair of blowers at each side of the machine which discharge air in relatively opposite directions have their outlets connected with suitable conduits 33 which open through suitably formed openings in the bottom wall 10. A plurality of closely spaced longitudinally extending plates 34 are arranged in each conduit 33 and divide the air entering said conduits into a plurality of separate air streams. At the egress end of the conduit and between the spaced plates 34, a plurality of inclined shutter blades 35ª are arranged, at which point each of the individual air streams will be further subdivided. Thus the velocity of the air is progressively increased and as the air is discharged downwardly between the shutter blades 35, it will exert an appreciable impactive force thereon producing a cumulative lifting effect of appreciable degree.

From the above description, the several constructions which I have herein referred to will be readily understood. Of course various other structural means might be utilized in the body of the aircraft for the purpose of taking advantage of the high velocity air currents to produce a lifting impulse more or less uniformly distributed which in conjunction with the vacuum produced at the upper side of the body structure and the greater density of the air strata below the same, will result in the desired increase in buoyancy whereby the machine will ascend under the operation of the several blowers, and without necessitating the employment of additional propellers or other means.

In carrying out this fundamental principle of my present disclosure, it is also possible to construct the body structure or fuselage of the aircraft in numerous other forms than that which I have selected for purposes of illustration. Accordingly, it is to be understood that in the further practical development of the invention, I reserve the privilege of resorting to all such legitimate changes in the form, construction and relative arrangement of the several parts as may be fairly embodied within the spirit and scope of the invention as claimed.

I claim:

1. Aircraft structure of parallelogrammatic form, means for continuously withdrawing an air film from the entire upper surface area of said structure to produce a distributed partial vacuum, means for directing such air under pressure against spaced internal parts of the structure to produce a series of lifting efforts, and means for discharging the air under increased velocity in a multiplicity of air streams downwardly externally of said structure to produce an additional lifting effort.

2. Aircraft structure of parallelogrammatic form, a plurality of high pressure blowers mounted in said structure, and the top wall of said structure being provided with means for distributing the induction effect of the blowers over the entire surface area of said structure to produce a correspondingly distributed partial vacuum.

3. Aircraft structure of parallelogrammatic form, a plurality of high pressure blowers mounted in said structure, the top wall of said structure being provided with means for distributing the induction effect of the blowers over the entire surface area of said structure to produce a correspondingly distributed partial vacuum, and manually adjustable members cooperating respectively with different parts of said means to reduce the induction effect of the blowers at will over selected portions of the upper surface area of said structure.

4. Aircraft structure of parallelogrammatic form, a plurality of high pressure blowers mounted in said structure, the top wall of said structure being provided with means for distributing the induction effect of the blowers over the entire surface area of said structure to produce a correspondingly distributed partial vacuum, such air being discharged from the blowers internally of said structure, and said structure having spaced internal surfaces receiving a lifting pressure influence from the high velocity air currents, and one end wall of said structure being provided with openings for the final discharge of air therethrough externally of the structure.

5. Aircraft structure of parallelogrammatic form, a plurality of high pressure blowers mounted in said structure, the top wall of said structure being provided with means for distributing the induction effect of the blowers over the entire surface area of said structure to produce a correspondingly distributed partial vacuum, manually adjustable members cooperating respectively with different parts of said means to reduce the induction effect of the blowers at will over selected portions of the upper surface area of said structure, and the bottom wall of said structure being provided with means for subdividing air discharged from each blower into a plurality of high velocity air streams and directing the same downwardly below said structure to produce an additional lifting effort.

6. Aircraft structure of parallelogrammatic form, a series of longitudinally spaced high pressure blowers arranged in each side of said structure, means for operating the corresponding blowers in pairs, and the top wall of said structure being provided over substantially its entire area with uniformly distributed air pockets in open communication with the intakes of the blowers whereby a uniformly distributed high pressure induction effect is produced over the upper surface area of the structure to create a correspondingly distributed partial vacuum.

7. Aircraft structure of parallelogrammatic form, a series of longitudinally spaced high pressure blowers arranged in each side of said structure, means for operating the corresponding blowers in pairs, the top wall of said structure being provided over substantially its entire area with uniformly distributed air pockets in open communication with the intakes of the blowers whereby a uniformly distributed high pressure induction effect is produced over the upper surface area of the structure to create a correspondingly distributed partial vacuum, the front and rear ends of said structure being obliquely inclined in parallel planes and the front end wall being provided with air inlet passages in communication with the blower intakes, and the rear end wall of said structure having air outlet openings therein through which the air is exhausted from the blowers externally of said structure.

8. Aircraft structure of parallelogrammatic form, a series of longitudinally spaced high pressure blowers arranged in each side of said structure, means for operating the corresponding blowers in pairs, the top wall of said structure being provided over substantially its entire area with uniformly distributed air pockets in open communication with the intakes of the blowers whereby a uniformly distributed high pressure induction effect is produced over the upper surface area of the structure to create a correspondingly distributed partial vacuum, the bottom wall of said structure having means for subdividing air discharged from each blower into a plurality of high velocity air streams and directing the same downwardly exteriorly of said structure to produce a substantially uniformly distributed lifting effort, the front and rear ends of said structure being obliquely inclined in parallel planes and the front end wall being provided with air inlet passages in communication with the blower intakes, and the rear end wall of said structure having air outlet openings therein through which the air is exhausted from the blowers externally of said structure.

9. Aircraft having a part subject to atmospheric pressure on the upper side thereof, means for withdrawing an air film from either a selected portion, or the entire upper surface area of said part, and distributing the withdrawn air film in substantial tangential relation to the under surface of said part and in contact therewith to produce a lifting effort.

10. Aircraft having a part subject to atmospheric pressure on the upper side thereof, the said upper side of said part having uniformly distributed cells or cavities provided with perforate walls, and means for drawing air films into said cavities and through the perforated walls thereof to produce a partial vacuum effect in each of said cells and reduce the atmospheric pressure on the cell walls.

11. Aircraft having a part subject to atmospheric pressure on the upper side thereof, the said upper side of said part having uniformly distributed cells or cavities provided with perforate walls, and means for drawing air films into said cavities and through the perforated walls thereof to produce a partial vacuum effect in each of said cells and reduce the atmospheric pressure on the cell walls, and additional means for selectively closing communication between certain groups of cells and the vacuum producing means.

12. Aircraft structure having a part provided with equally distributed cells or pockets the walls of which are subject to atmospheric pressure and said cells or pockets being covered on one side by pervious material, and means for withdrawing air films over the walls of said pockets through the pervious material to produce a partial vacuum in each of said cells and reduce the atmospheric pressure upon the cell walls.

13. Aircraft structure having top, bottom and end walls, said top wall being composed of uniformly distributed cells or pockets opening upon the under side of said wall, means carried by said structure for producing an induction effect in each of said cells and withdrawing air films over the cell walls to reduce atmospheric pressure thereon, the opposite end walls of said structure having openings therethrough, and said induction producing means adapted to draw air into the structure through one of said end walls and expel the air therefrom through the other end wall.

In testimony that I claim the foregoing as my invention, I have signed my name hereto.

BROR MAX SCHAUMAN.